US012809744B2

(12) United States Patent
Luthra et al.

(10) Patent No.: US 12,809,744 B2
(45) Date of Patent: Nov. 24, 2026

(54) SYSTEM, METHOD, AND NON-TRANSITORY COMPUTER-READABLE MEDIA FOR PERFORMING END-TO-END APPLICATION ONBOARDING

(71) Applicant: Rakuten Mobile, Inc., Tokyo (JP)

(72) Inventors: Mohit Luthra, Singapore (SG); Pankaj Garg, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 729 days.

(21) Appl. No.: 17/997,554

(22) PCT Filed: Aug. 5, 2022

(86) PCT No.: PCT/US2022/039513
§ 371 (c)(1),
(2) Date: Oct. 31, 2022

(87) PCT Pub. No.: WO2024/030133
PCT Pub. Date: Feb. 8, 2024

(65) Prior Publication Data
US 2025/0094315 A1 Mar. 20, 2025

(51) Int. Cl.
*G06F 11/3604* (2025.01)
*G06F 11/3698* (2025.01)

(52) U.S. Cl.
CPC ...... *G06F 11/3608* (2013.01); *G06F 11/3698* (2025.01)

(58) Field of Classification Search
CPC ......................... G06F 11/3608; G06F 11/3698
See application file for complete search history.

(56) References Cited

U.S. PATENT DOCUMENTS

| | | | | |
|---|---|---|---|---|
| 9,110,496 | B1 * | 8/2015 | Michelsen | G06F 11/3688 |
| 9,658,833 | B2 * | 5/2017 | Heyhoe | G06F 8/30 |
| 9,992,080 | B2 * | 6/2018 | Amendjian | H04L 41/20 |
| 10,318,285 | B1 * | 6/2019 | Jodoin | G06F 11/3688 |
| 2006/0059253 | A1 * | 3/2006 | Goodman | G06Q 10/10 709/223 |
| 2014/0040871 | A1 * | 2/2014 | Schwan | G06F 8/71 717/141 |
| 2014/0372167 | A1 * | 12/2014 | Hillier | G06Q 10/06315 705/7.24 |
| 2015/0248484 | A1 * | 9/2015 | Yu | G06F 16/9535 707/711 |

(Continued)

*Primary Examiner* — Lewis A Bullock, Jr.
*Assistant Examiner* — Theodore E Hebert
(74) *Attorney, Agent, or Firm* — HAUPTMAN HAM, LLP

(57) ABSTRACT

A device and method for providing end-to-end application onboarding. An application bundle is uploaded to a pre-production system and pre-production testing of the application bundle is requested. In response to the application bundle passing the pre-production testing, approval of the application bundle is received. In response to receiving the approval of the application bundle, quality assurance testing of the application bundle is performed in at least one pre-production test environment isolated from the production environment. In response to the application bundle passing the quality assurance testing in the at least one pre-production test environment isolated from the production environment, the application bundle is promoted to the production environment.

20 Claims, 15 Drawing Sheets

(56) References Cited

U.S. PATENT DOCUMENTS

| | | | | |
|---|---|---|---|---|
| 2016/0055573 | A1* | 2/2016 | Chen | G06Q 30/0613 705/26.41 |
| 2016/0077809 | A1* | 3/2016 | Heyhoe | G06F 8/45 717/106 |
| 2016/0283348 | A1* | 9/2016 | Golde | G06F 11/3612 |
| 2017/0168918 | A1* | 6/2017 | Wieczorek | H04L 67/02 |
| 2017/0286281 | A1* | 10/2017 | Dahan | G06F 11/3696 |
| 2017/0289008 | A1* | 10/2017 | Lau | H04L 43/50 |
| 2018/0121335 | A1* | 5/2018 | Cillis | G06F 11/3672 |
| 2021/0311864 | A1* | 10/2021 | Gottlieb | G06F 11/3438 |
| 2022/0050674 | A1* | 2/2022 | Liljeback | G06F 8/60 |
| 2022/0253297 | A1* | 8/2022 | Wallis | H04L 67/34 |
| 2022/0300265 | A1* | 9/2022 | Purohit | G06F 11/3688 |
| 2023/0032088 | A1* | 2/2023 | Goswami | H04W 16/18 |
| 2023/0037124 | A1* | 2/2023 | Mengwasser | H04W 24/06 |
| 2023/0325298 | A1* | 10/2023 | Mohan | G06F 11/3612 717/126 |
| 2024/0127159 | A1* | 4/2024 | Chellappa | G06N 20/00 |

* cited by examiner

SYSTEM, METHOD, AND NON-TRANSITORY COMPUTER-READABLE MEDIA FOR PERFORMING END-TO-END APPLICATION ONBOARDING

RELATED APPLICATIONS

The present application is a National Phase of International Application No. PCT/US2022/039513, filed Aug. 5, 2022.

TECHNICAL FIELD

This description relates to a system, method, and non-transitory computer-readable media performing end-to-end application onboarding, method of using the same.

BACKGROUND

Newly developed software or applications go through an onboarding process that includes at least one of quality testing, verification, and certification. The onboarding process improves the software adoption process. However, the onboarding process used to deliver and integrate applications is a difficult and time consuming process.

The onboarding process involves many issues. Coordination among parties involved in the onboarding process decreases the efficiency and consumes more amount of time. Understanding infrastructure and a lack of automated deployments causes delays to market. With manual integration, communication, and integration with multiple teams, such as Cloud, Network, Security, and Infrastructure managers leads to increases cost. A lack of automated testing and security standardization leads to comprised quality.

SUMMARY

In at least embodiment, a method for providing end-to-end application onboarding includes uploading an application bundle of a vendor to a pre-production system, requesting pre-production testing of the application bundle, in response to the application bundle passing the pre-production testing, receiving an indication of approval of the application bundle, in response to receiving the indication of approval of the application bundle, performing quality assurance testing of the application bundle in at least one pre-production test environment isolated from the production environment, in response to the application bundle passing the quality assurance testing in the at least one pre-production test environment isolated from the production environment, promoting the application bundle to the production environment, and in response to the application bundle not passing the quality assurance testing in the at least one pre-production test environment isolated from the production environment, passing the application bundle to the vendor for editing.

In at least embodiment, a device for providing end-to-end application onboarding includes a memory storing computer-readable instructions, and a processor connected to the memory, wherein the processor is configured to execute the computer-readable instructions to upload an application bundle of a vendor to a pre-production system, request pre-production testing of the application bundle, in response to the application bundle passing the pre-production testing, receive an indication of approval of the application bundle, in response to receiving the indication of approval of the application bundle, perform quality assurance testing of the application bundle in at least one pre-production test environment isolated from the production environment, in response to the application bundle passing the quality assurance testing in the at least one pre-production test environment isolated from the production environment, promote the application bundle to the production environment, and in response to the application bundle not passing the quality assurance testing in the at least one pre-production test environment isolated from the production environment, pass the application bundle to the vendor for editing.

In at least embodiment, a non-transitory computer-readable media having computer-readable instructions stored thereon, which when executed by a processor causes the processor to perform operations including uploading an application bundle of a vendor to a pre-production system, requesting pre-production testing of the application bundle, in response to the application bundle passing the pre-production testing, receiving an indication of approval of the application bundle, in response to receiving the indication of approval of the application bundle, performing quality assurance testing of the application bundle in at least one pre-production test environment isolated from the production environment, in response to the application bundle passing the quality assurance testing in the at least one pre-production test environment isolated from the production environment, promoting the application bundle to the production environment, and in response to the application bundle not passing the quality assurance testing in the at least one pre-production test environment isolated from the production environment, passing the application bundle to the vendor for editing.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
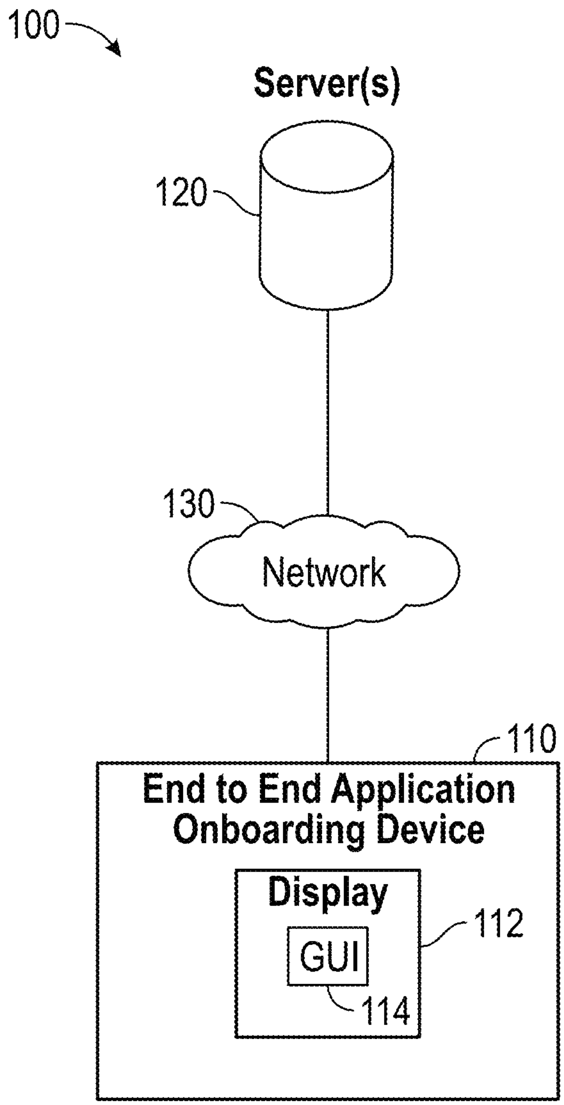
FIG. 1 illustrates an end-to-end application onboarding system according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Embodiments described herein provide an integrated process for performing end-to-end application onboarding. Deploying telecom applications and services presents many problems. For example, a failure to understand the infrastructure and a lack of automated deployments causes a delay to market. Manual integration involves communication and integration with multiple teams like Cloud, Network, Security, and Infrastructure, which leads to increases costs. Further, a lack of automated testing and security standardization leads to comprised quality. Embodiments described herein providing an integrated process for performing end-to-end application onboarding enable application vendors to create an application bundle, submit the application bundle for review, and register an approved application bundle on the service catalog.

Advantages include providing an integrated process integrated process for performing end-to-end application onboarding enable an application vendor to create application bundles and onboard the applications using an end to end flow for the application bundle from application bundle creation to promotion of the application bundle to production through the approval cycles. The an integrated process integrated process for performing end-to-end application onboarding takes less time and reduces human errors because the process is automated. Vendors are also able to provide details to downstream systems automatically.

FIG. 1 illustrates an end-to-end application onboarding system 100 according to at least one embodiment.

In FIG. 1, an end-to-end application onboarding system 110 is coupled to one or more Servers 120 through a network 130. One or more Servers 120 provide environments for supporting end-to-end application onboarding. For example, in at least one embodiment, one or more Servers 120 provide storage devices for storing application bundles of vendors, storage devices for storing non-production artifactories, and non-production systems, such as a service designer, a sandbox testing environment, and a staging testing environment. In at least one embodiment, one or more Servers 120 provide other non-production support systems, such as Enterprise Resource Planning (ERP) Systems (such as Katana), and Release Manager/Ticketing System (such as QZEN). In at least one embodiment, one or more Servers 120 provide production systems, such as a production artifactory, a production service catalog service, and other productions systems, such as a MarketPlace where applications are selected for use by different users. These are discussed in further detail with reference to the following figures.

End-to-end application onboarding system 110 includes a display 112 that presents a graphical user interface (GUI) 114. Information from the storage devices, non-production systems, and production systems.

Figure 2:
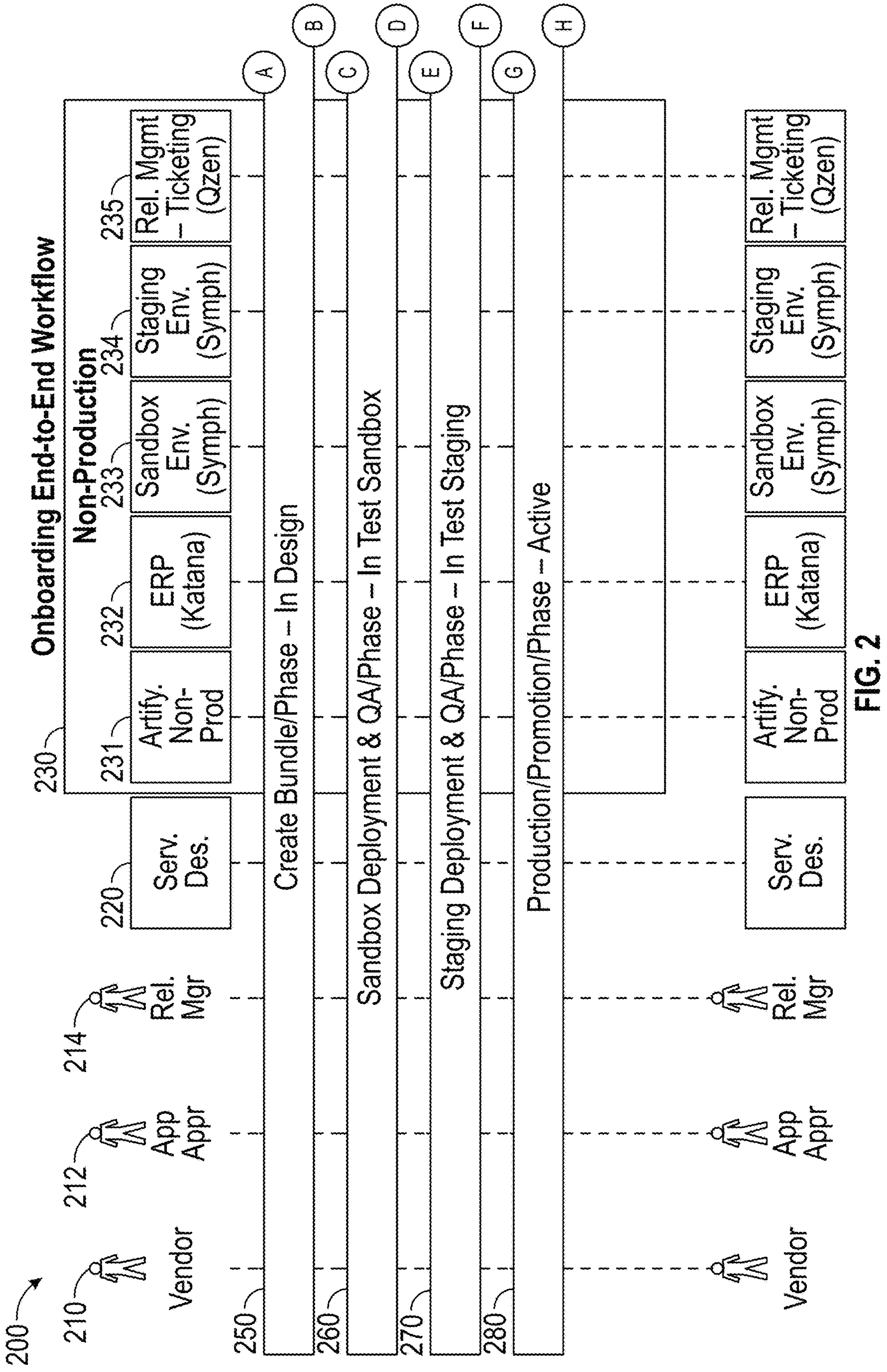
FIG. 2 is a flow diagram for end-to-end application onboarding according to at least one embodiment.
Figure 2:
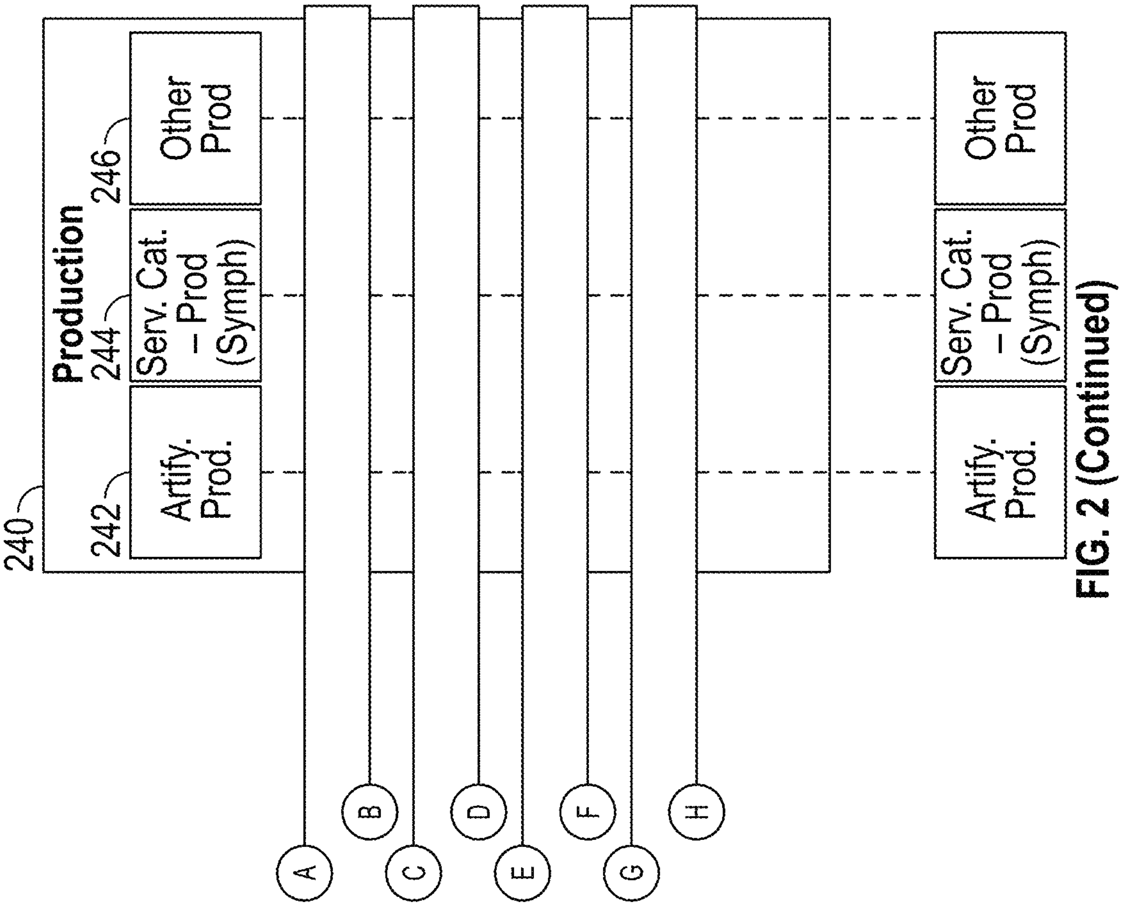

FIG. 2 is a flow diagram for end-to-end application onboarding 200 according to at least one embodiment.

In FIG. 2, a Vendor 210, an Application Approver 212, and a Release Manager 214 have access to the end-to-end application onboarding system. A Service Designer 220 is provided for The onboarding process is divided into a Non-Production (Pre-Production) Stage 230 and a Production Stage 240. The Non-Production Stage 230 includes a Non-Production Artifactory 231, an Enterprise Resource Planning (ERP) System 232 (e.g., Katana), a Sandbox Environment 233 (e.g., Symphony Sandbox), a Staging Environment 234 (e.g., Symphony Staging), and a Release Management/Ticketing System 235 (e.g., QZEN). The Production Stage 240 includes a Production Artifactory 242, a Production Service Catalog System 244 (e.g., Symphony), and Other Production Systems 246 (e.g., MarketPlace).

The environments in the Non-Production Stage 230 are isolated from the environments in the Production Stage 240. The Vendor 210, Application Approver 212, and Release Manager 214 are able to communicate with upstream and downstream systems. The end-to-end application onboarding system 200 integrates the steps in the life cycle of an application bundle, such as development, pre-production sandbox testing, staging testing, and production.

In the Create Bundle/In Design Phase 250, an application bundle is submitted and a determination is made whether to perform sandbox testing and staging testing, or to skip sandbox testing and perform staging testing. In the Sandbox Deployment and Quality Assurance (AQ) Phase 260 the application is tested in a Sandbox Environment 233 that simulates the production environment. The Sandbox Environment and QA Phase 260 isolates untested code from the production environment.

The Staging Deployment and QA Phase 270 uses a Staging Environment 234 where an application is tested on a near-production level, but in a non-production environment, to verify that the application bundle will behave correctly after deployment. The Production Phase 280 is where the application bundle is promoted after approved in the Staging Deployment and QA Phase 270.

Non-Production Artifactory 231 and Production Artifactory 242 house and manage the artifacts, binaries, packages, files, containers, and components of the application bundle in the Non-Production Stage 230 and in the Production Stage 240, respectively. Release management/Ticketing System 235, such as QZEN, is provided where the release of the product goes through a series of checks before it can be promoted to the next phase. The Production Service Catalog System 244 is where the application bundle is provided in the Production Stage 240. Other Production Systems 246 handle other production calls in the Production Stage, such as calls to promote the application bundle to the MarketPlace.

The end-to-end application onboarding system 200 triggers deployment of the application bundle to the Sandbox Deployment and QA Phase 260 or the Staging Deployment and QA Phase 270. If the Application Approver 212 and the Release Manager 214 are not provided, then the Vendor uses QZEN 235 to trigger deployment of the application bundle. The Vendor 212 communicates with the Sandbox Environment 233 and the Staging Environment 234 to get the infrastructure aligned for the Sandbox Deployment and QA Phase 260 and the Staging Deployment and QA Phase 270. The end-to-end application onboarding system 200 provides a continuous delivery and integration framework through the ERP system 232, e.g., Katana. The end-to-end application onboarding system 200 passes the application bundle through the ERP system 232 to the Sandbox Deployment and QA Phase 260 and to the Staging Deployment and QA Phase 270.

Figure 3:
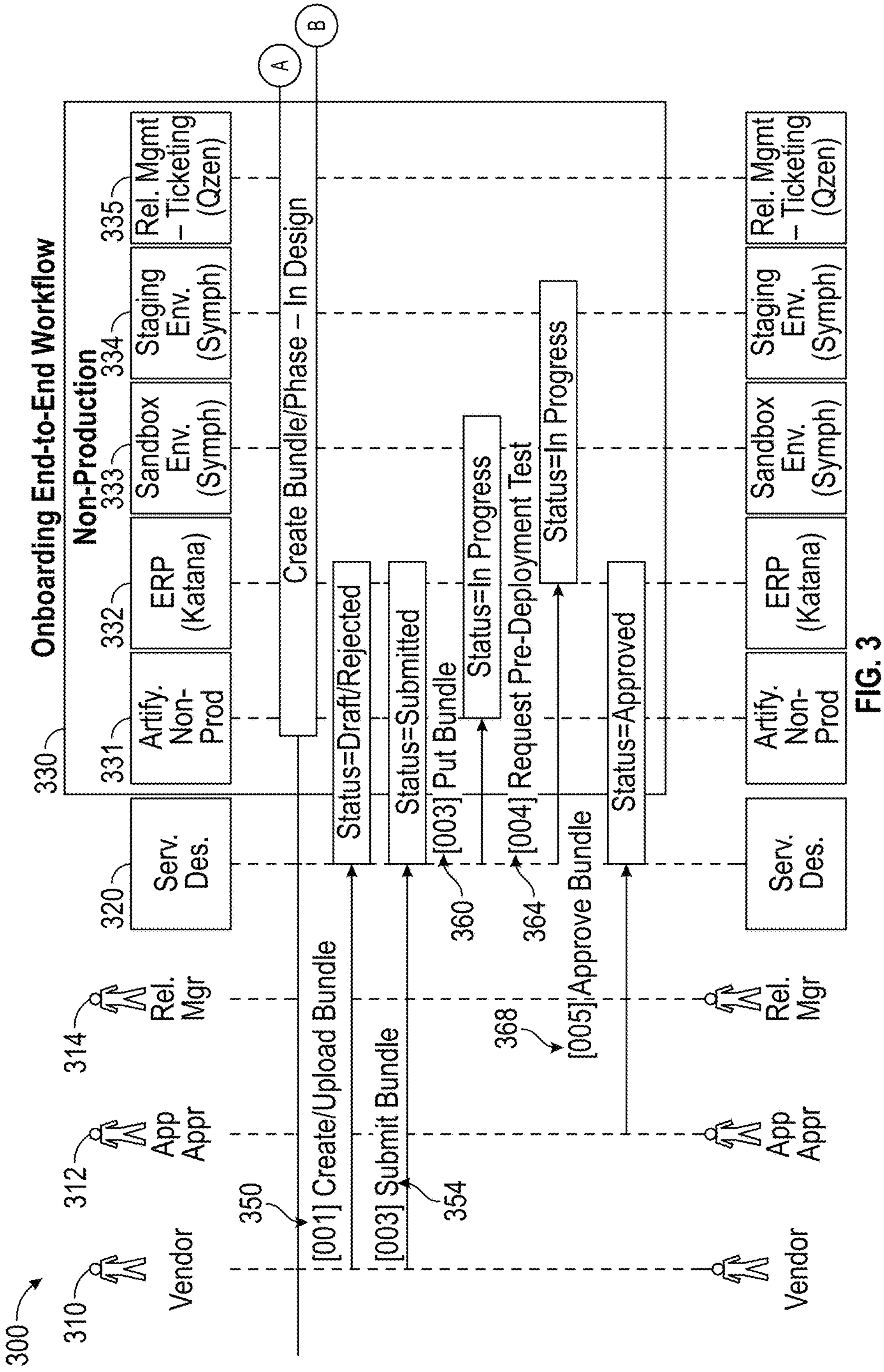
FIG. 3 illustrates the Create Bundle/In Design Phase according to at least one embodiment.
Figure 3:
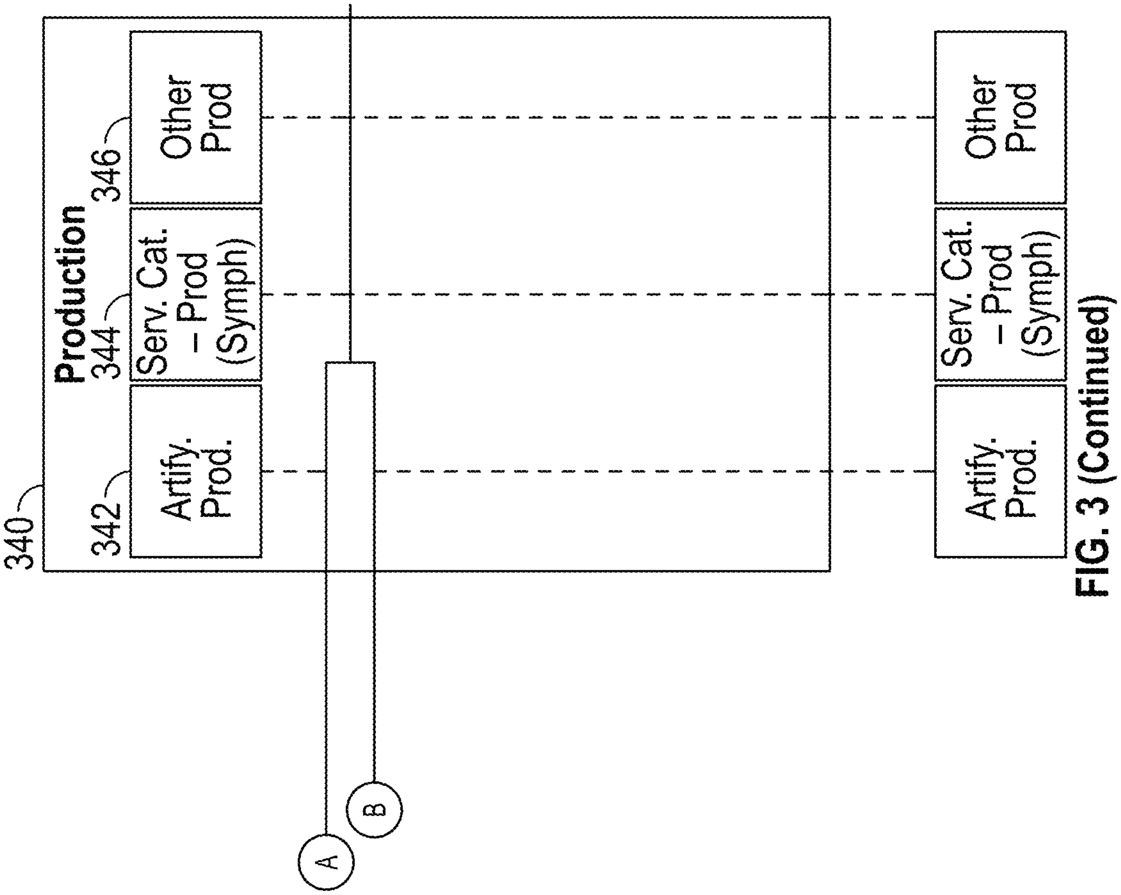

FIG. 3 illustrates the Create Bundle/In Design Phase 300 according to at least one embodiment.

In FIG. 3, the flow in the In Design Phase 300 is handled using a Business Process Model and Notation (BPMN) Service, such as Device Repository Web Service (DWS). BPMN provides a graphical notation for business procedures and provides communication of procedures in a predetermined manner, wherein DWS provides a language independent REST interface to the device repository.

In FIG. 3, the onboarding process is divided into a Non-Production (Pre-Production) Stage 330 and a Production Stage 340. The Non-Production Stage 330 includes a Non-Production Artifactory 331, an Enterprise Resource Planning (ERP) System 332 (e.g., Katana), a Sandbox Environment 333 (e.g., Symphony Sandbox), a Staging Environment 334 (e.g., Symphony Staging), and a Release Management/Ticketing System 335 (e.g., QZEN). The Production Stage 340 includes a Production Artifactory 342, a Production Service Catalog System 344 (e.g., Symphony), and Other Production Systems 346 (e.g., MarketPlace).

The In Design Phase 300 is triggered as soon as an application bundle enters draft status. There are 2 options: 1) a new bundle/version is created or 2) a rejected bundle is edited for the first time. As soon an application bundle is created or uploaded 350, the In Design Phase 300 is triggered and the workflow configuration of the Vendor 310 of the application bundle is fetched from a database. FIG. 3 also shows the Application Approver 312 and the Release Manager 314. The workflow configuration indicates whether the current application bundle is eligible for deployment in the Sandbox Deployment and QA Phase or not.

Once the Vendor 310 obtains the workflow configuration, the application bundle is submitted 354 via the Service Designer 320, and the application bundle is uploaded 360 to the 360 to the Non-Production Artifactory 331 (e.g., JFROG). A request for pre-deployment testing is generated 364 where Non-Production scans are performed. For example, in at least one embodiment SONAR and XRAY are run on the artifacts of the uploaded application bundle.

The Application Approver 312 or Release Manager 314 access the Service Designer 320 to either approve the application bundle or reject the application bundle. In response to the application bundle being rejected, a notification will be sent to the Vendor 310. The Vendor 310 is able to edit the application bundle or create a new application bundle and begin again. In response to the application bundle being approved 368, then based on the workflow configuration of the Vendor 310, the application bundle is promoted to the next stage, which is either the Sandbox Deployment and QA Phase or the Staging Deployment and QA Phase. Thus, the sandbox testing is able to be skipped and the application bundle sent to the Staging Deployment and QA Phase. The workflow is able to be flexibly and uniquely configured by a Vendor 310. A Vendor 310 may not go through testing via the Release Management/Ticketing System 335, such as QZEN. The ability to configure the flow enables to the Vendor 310 to select configuration without any changes in code.

Figure 4:
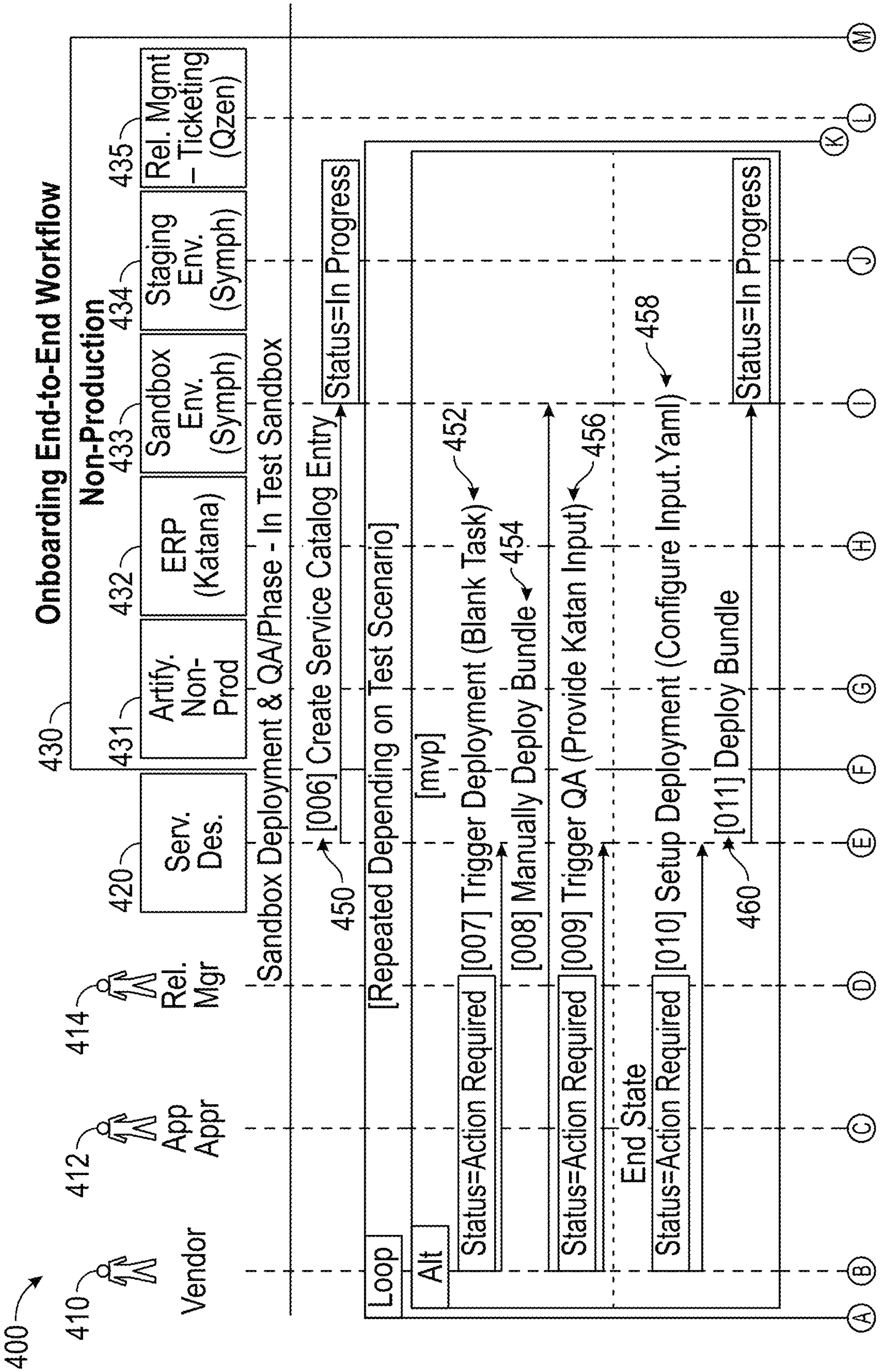
FIG. 4 illustrates the Sandbox Deployment and QA Phase according to at least one embodiment.
Figure 4:
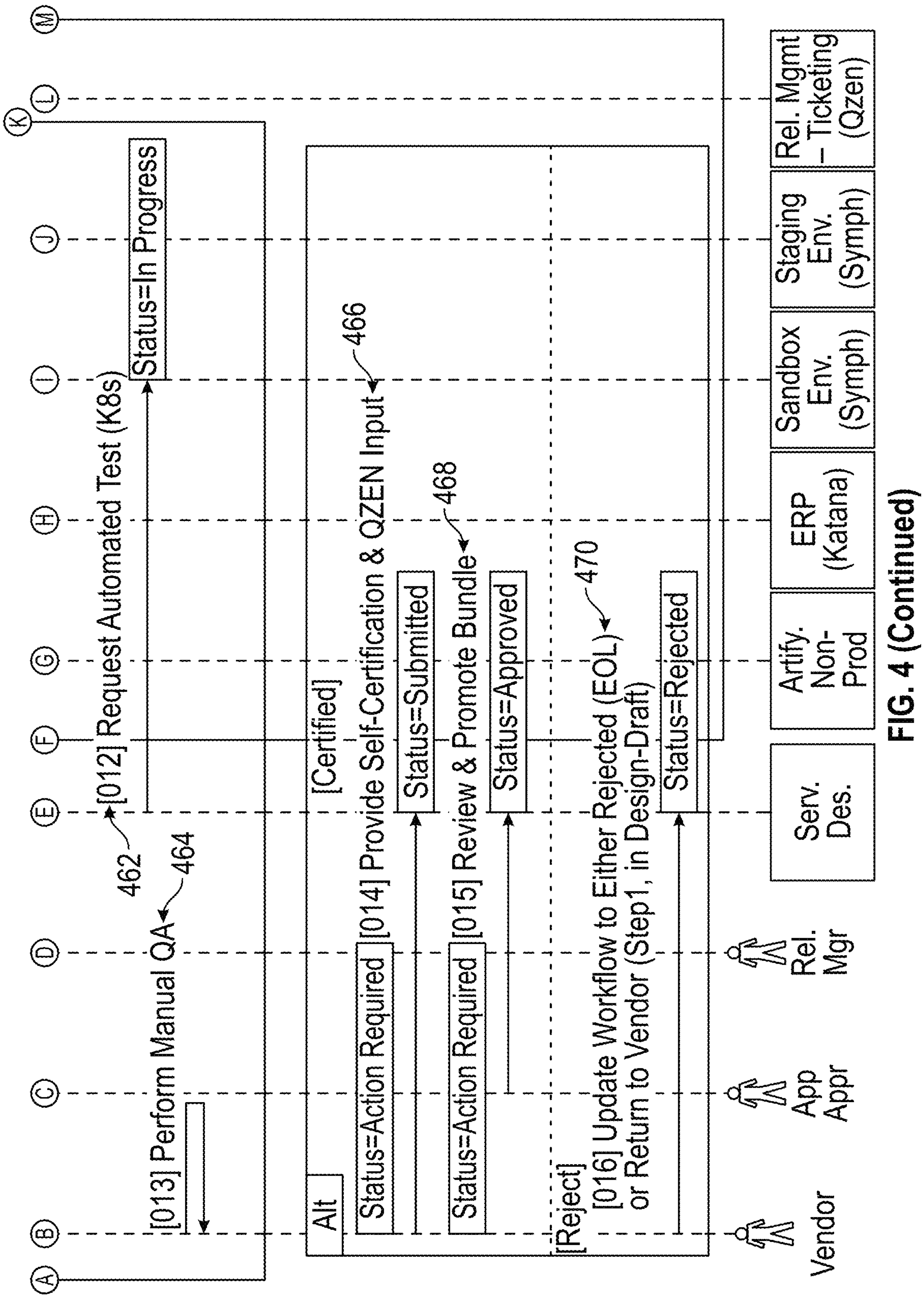

FIG. 4 illustrates the Sandbox Deployment and QA Phase 400 according to at least one embodiment.

In FIG. 4, the Sandbox Deployment and QA Phase 400 involves the Non-Production Stage 430, which includes a Non-Production Artifactory 431, an Enterprise Resource Planning (ERP) System 432 (e.g., Katana), a Sandbox Environment 433 (e.g., Symphony Sandbox), a Staging Environment 434 (e.g., Symphony Staging), and a Release Management/Ticketing System 435 (e.g., QZEN). In response to determining to perform sandbox testing, a service catalog entry is created 450 at the Service Designer 420 and is sent to the Sandbox Environment 433. In the Sandbox Deployment and QA Phase 400, multiple actions are triggered automatically, e.g., pre deployment checks, or performed manually. The Vendor 410 triggers at the Service Designer 420 deployment of the application bundle 452 to the Sandbox Environment 433 or manually deploys the application bundle 454 to the Sandbox Environment. FIG. 4 also shows the Application Approver 412 and the Release Manager 414.

For automatic scanning, the Service Designer 420 sends the Sandbox Environment 433 a request for automated testing 456. The application bundle is scanned automatically for AQ testing via input to the ERP System by the Vendor 410 through the Service Designer 420. In response to QA testing being automatically triggered 456, the Vendor sets up a deployment configuration 458 at the Service Designer and deploys the application bundle 460 to the Sandbox Environment 433. The Service Designer 420 sends a request for automated tests 462. In response to not performing automatic QA testing, the Vendor performs manual QA testing 464.

An indication of approval or rejection is provided to the Vendor 410. In response to indication of rejection of the application, the Vendor updates the workflow at the Service Designer to either reject the application bundle or return the application bundle for editing 470. In response to the application bundle being approved, the Vendor 410 is presented with a new "kebab menu" for selecting 'Self Certification' in the listing of the application bundles. The Vendor 410 provides self-certification and QZEN input 466 to the Service Designer 420, wherein the Application Approver 412 then reviews and promotes the application bundle 468 and the application bundle is copied to the Staging Deployment and QA Phase.

Figure 5:
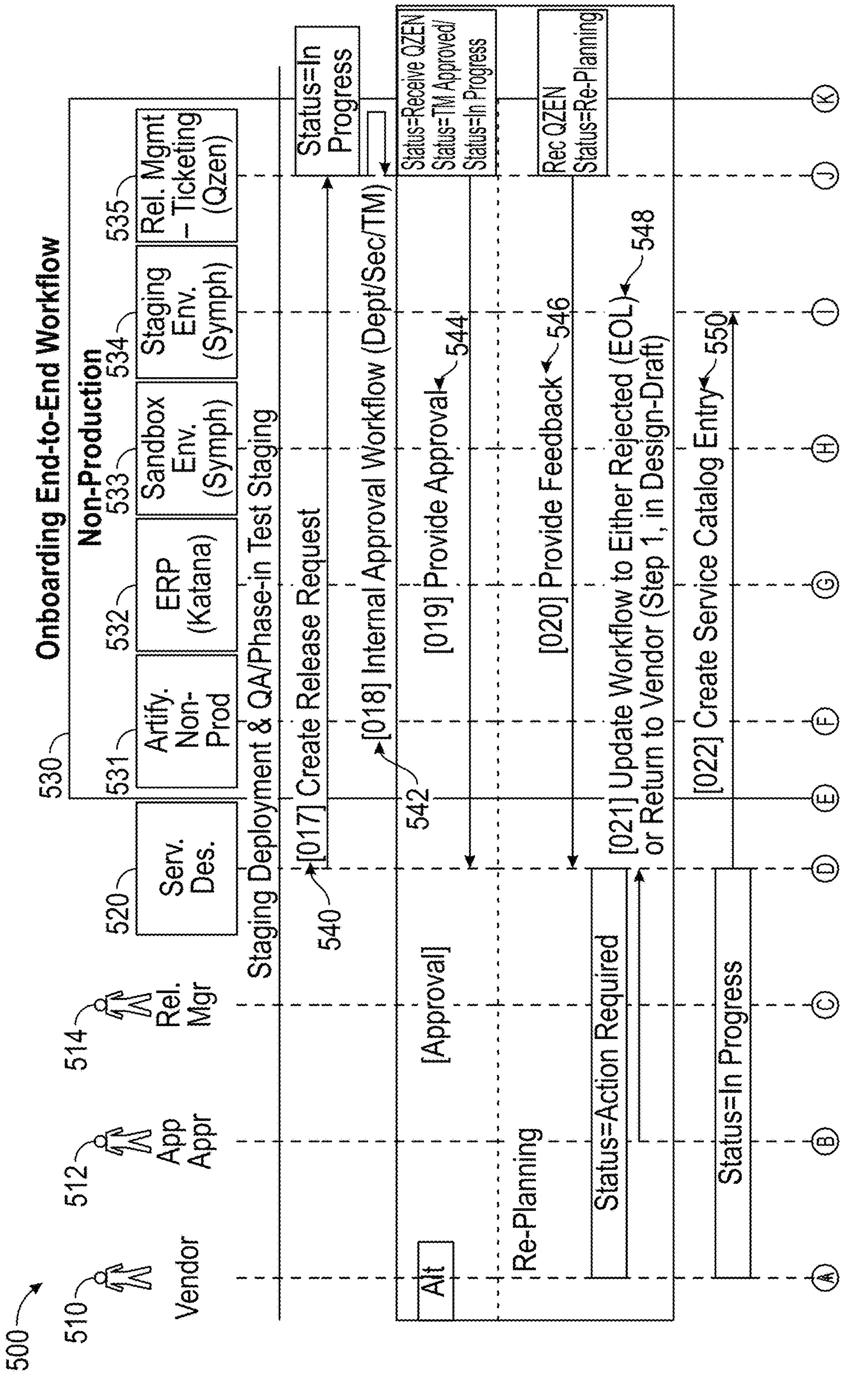
FIG. 5 illustrates the Staging Deployment and QA Phase according to at least one embodiment.
Figure 5:
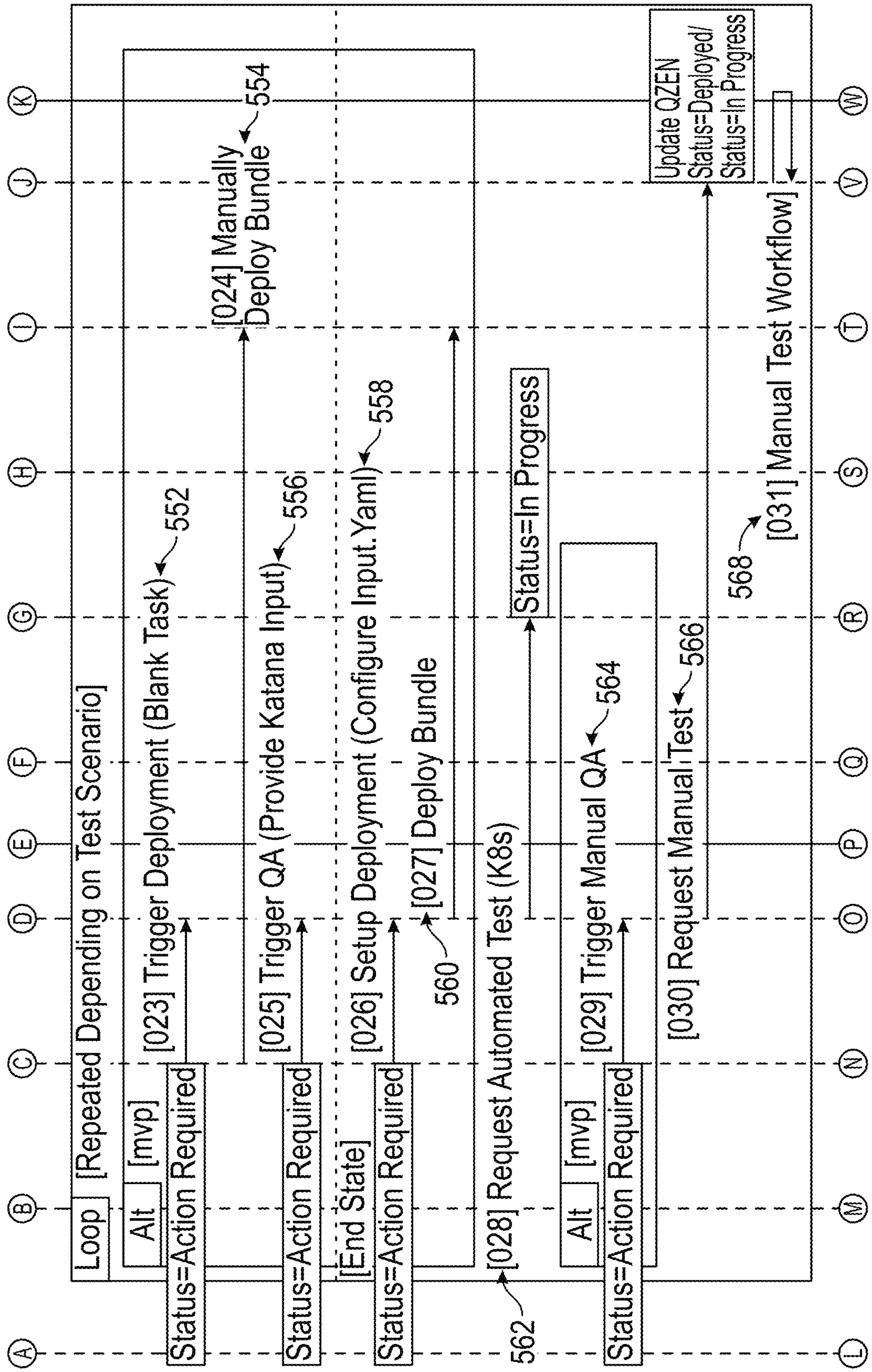
Figure 5:
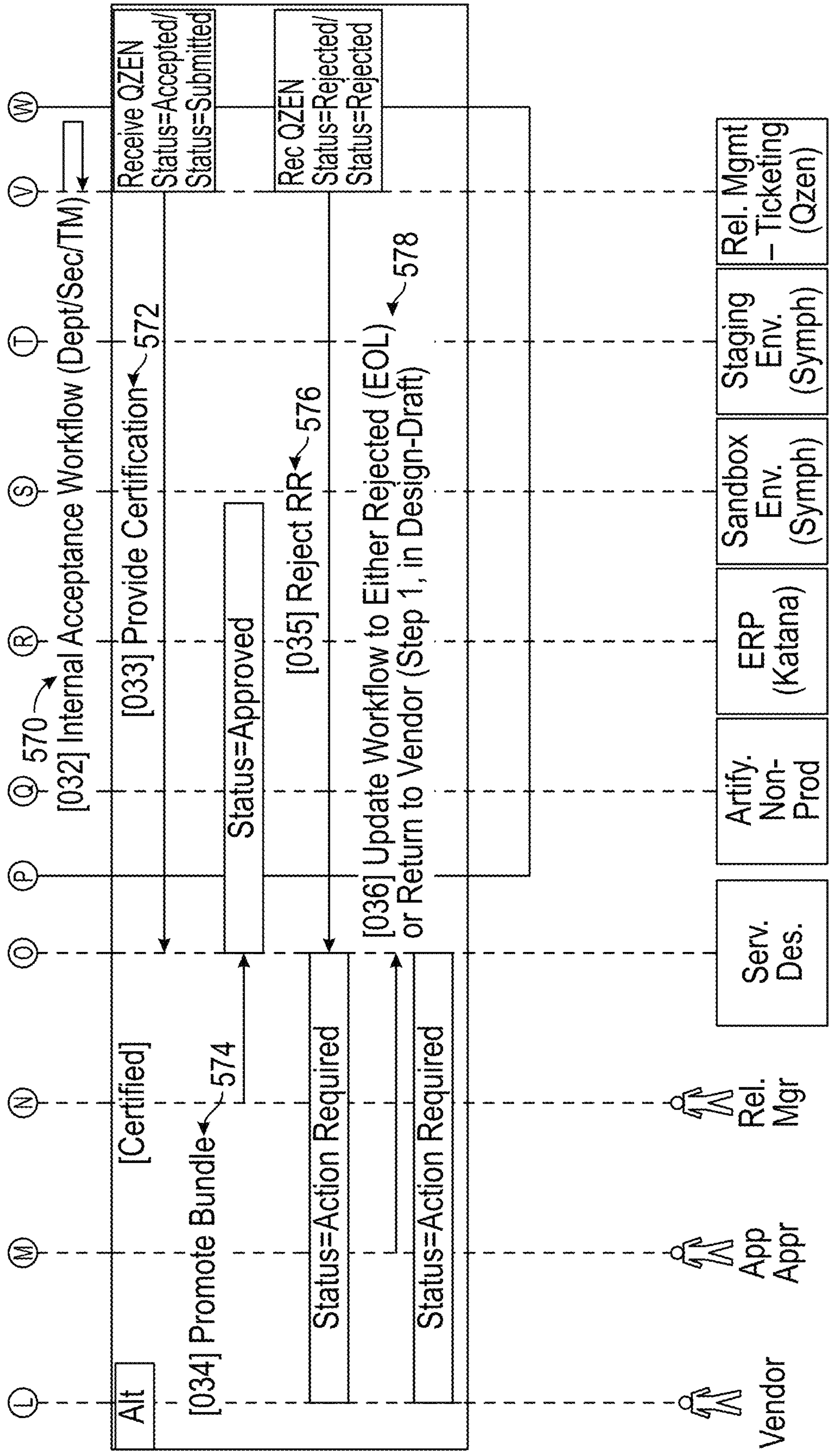

FIG. 5 illustrates the Staging Deployment and QA Phase 500 according to at least one embodiment.

In FIG. 5, the Staging Deployment and QA Phase 500 involves the Non-Production Stage 530, which includes a Non-Production Artifactory 531, an Enterprise Resource Planning (ERP) System 532 (e.g., Katana), a Sandbox Environment 533 (e.g., Symphony Sandbox), a Staging Environment 534 (e.g., Symphony Staging), and a Release Management/Ticketing System 535 (e.g., QZEN). After passing the pre-deployment testing and deciding to skip sandbox testing, or after being promoted at the end of sandbox testing, the application bundle passes to the Staging Deployment and QA Phase 500.

Upon beginning the Staging Deployment and QA Phase 500, the Service Designer 520 provides values to the Release Management/Ticketing System 535 (e.g., QZEN) along with a release request 540. At the Release Management/Ticketing System 535, one or more internal approval workflows are triggered and multiple approvals are determined 542, e.g., department manager, technical manager, etc. The status of Approval is In Progress.

The Release Management/Ticketing System 535 returns an indication of Approval 544 or Re-Planning 546, and the Vendor 510 is notified accordingly via the Service Designer 520. The Approval 544 or Re-Planning 546 status is received via API polling. In response to receiving indication of Re-Planning 546, the Vendor updates workflow at the Service Designer 520 to either reject the application bundle or return the application bundle 548 to the Vendor 510 to repeat the process to obtain certification.

In response to receiving indication of Approval 544, a Service Catalog Entry is created 550 for staging at the Service Designer 520 that is sent to the Staging Environment 534. Release manager 514, through the Service Designer 520, triggers deployment of the application bundle 552 to the Staging Environment 534 or manually deploys the application bundle 554 to the Staging Environment 534. Once deployment is complete, an API from the Release Management/Ticketing System 535 is executed to update the status to deployed and then QA testing begins.

The Release Manager 514 triggers QA testing 556 via input 562 to the ERP System 532 through the Service Designer 520. Once automatic QA testing is triggered 556, the technical parameters are analyzed according to a configuration file 558, e.g., a configuration input.yaml file. The Service Designer 520 sends a request for automated QA testing to the ERP System 532.

Alternatively, the Release Manager 514 triggers manual QA testing 564 via the Service Designer 520. The Service Designer 520 sends a request for manual QA testing 566 to the Release Management/Ticketing System 535. A manual QA testing workflow is executed 568.

Internal acceptance workflows are executed 570 at the Release Management/Ticketing System 535 and multiple approvals are determined, e.g., department manager, technical manager, etc. The status of the application bundle from the Release Management/Ticketing System 535 is polled to determine whether the application bundle is approved or is rejected.

In response to performing automatic QA testing or manual QA testing, the Release Management/Ticketing System 535 provides self-certification 572 or rejection 576 to the Service Designer 520. The Release Manager 514 promotes the application bundle 574 to the Production Stage through the Service Designer 520 or the Application Approver 512 rejects the application bundle and updates the workflow 578 at the Service Designer 520 to either reject the application bundle or return the application bundle to the Vendor 510.

Figure 6:
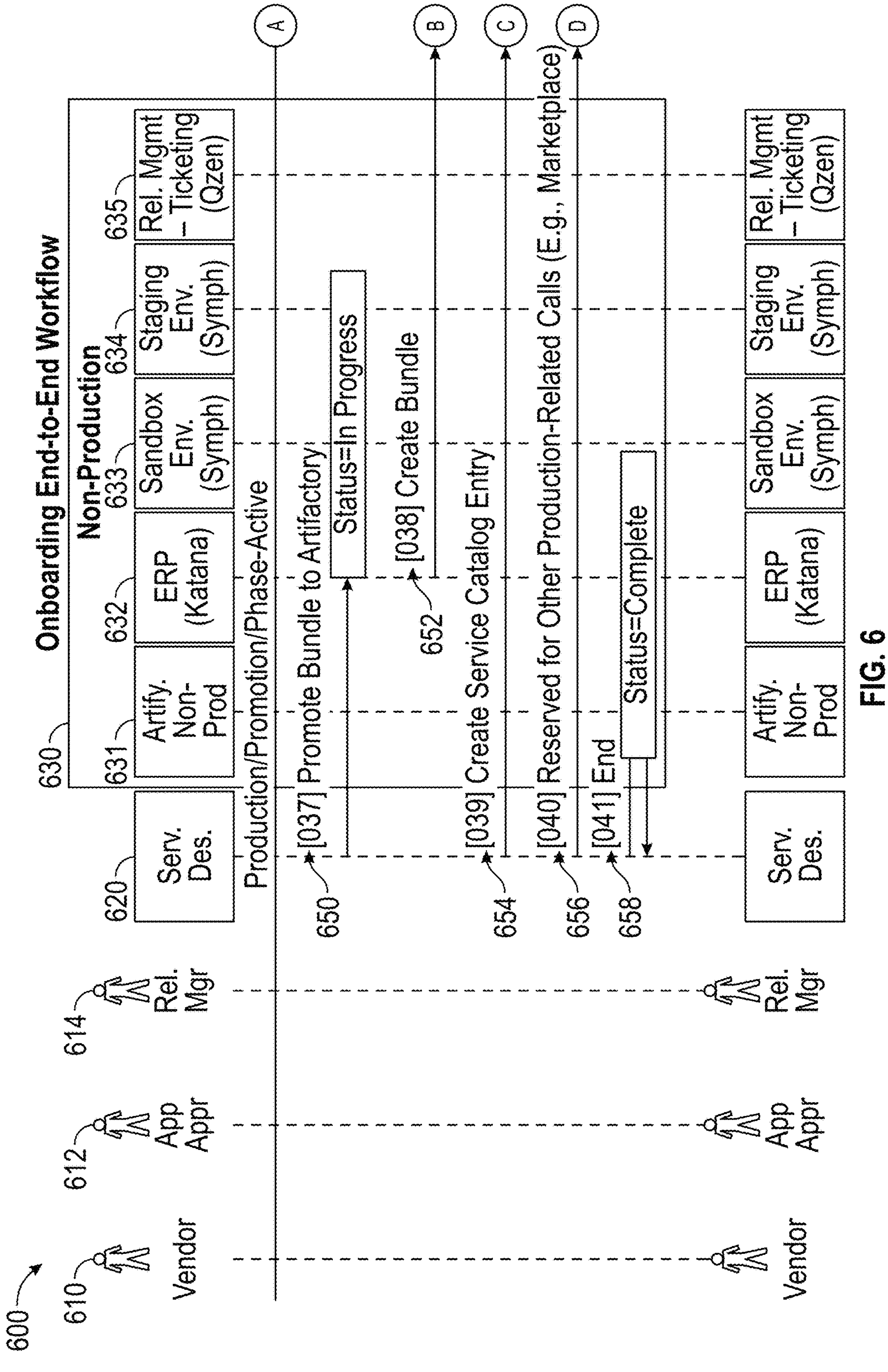
FIG. 6 illustrates the Production Stage according to at least one embodiment.
Figure 6:
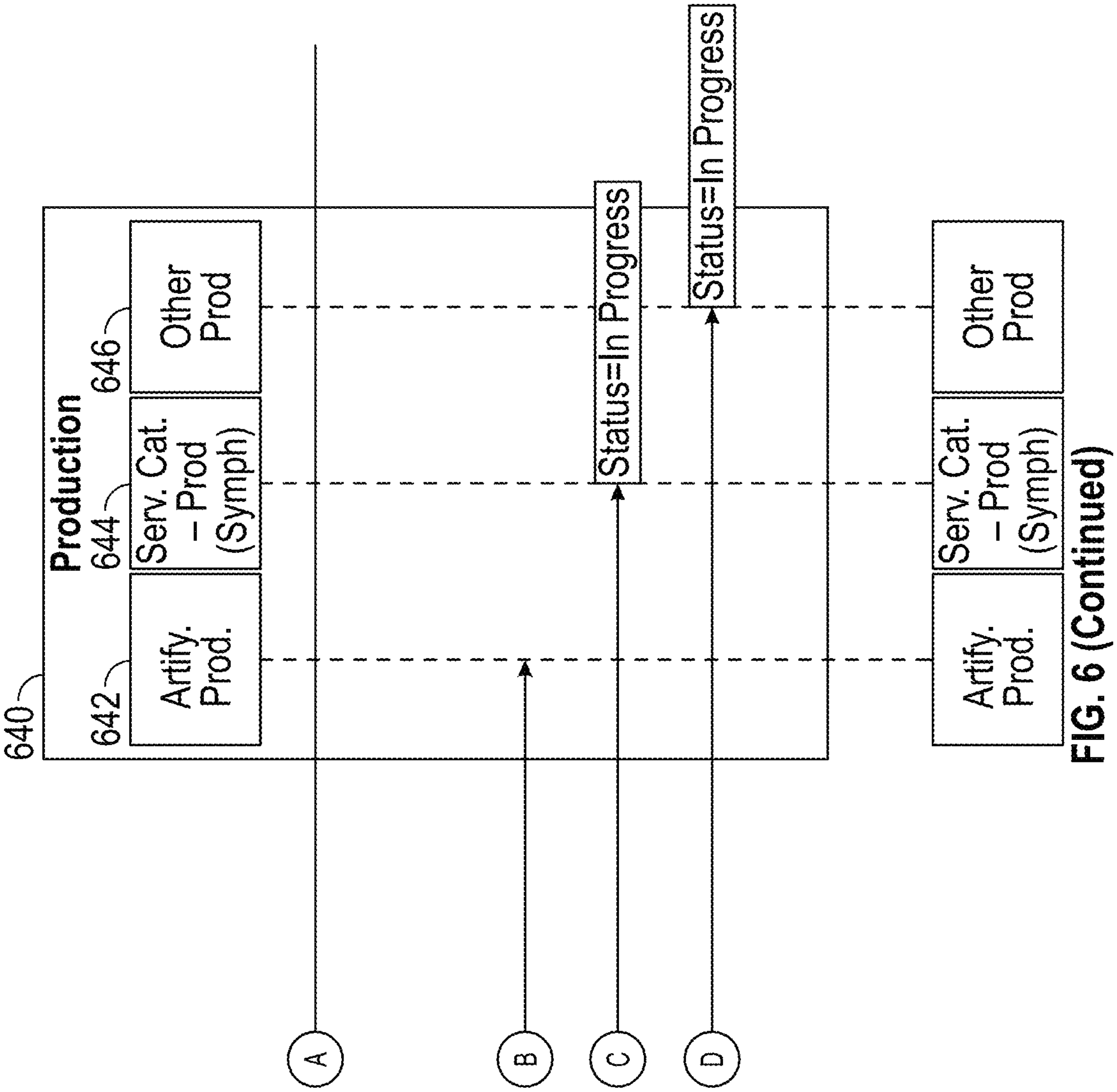

FIG. 6 illustrates the Production Stage 600 according to at least one embodiment.

FIG. 6 again shows the Vendor 610, the Application Approver 612, and the Release Manager 614. FIG. 6 also shows the Non-Production (Pre-Production) Stage 630 and the Production Stage 640. Again, the Non-Production Stage 630 includes a Non-Production Artifactory 631, an Enterprise Resource Planning (ERP) System 632 (e.g., Katana), a Sandbox Environment 633 (e.g., Symphony Sandbox), a Staging Environment 634 (e.g., Symphony Staging), and a Release Management/Ticketing System 635 (e.g., QZEN). The Production Stage 640 includes a Production Artifactory 642, a Production Service Catalog System 644 (e.g., Symphony), and Other Production Systems 646 (e.g., MarketPlace). Once the application bundle is promoted to the Production Stage, the Service Designer 620 promotes the application bundle 650 through the ERP System 632. The ERP System 632 creates an application bundle 652 which is passed to the Production Artifactory 642. Then, the Service Designer 620 creates a service catalog entry 654 at the Production Service Catalog System 644. Service Designer 620 provides production-related calls 656 to the Other Production Systems 646, where the application bundle is promoted to the MarketPlace. Values are passed to other downstream systems. The Service Designer 620 then ends the process 658.

Figure 7:
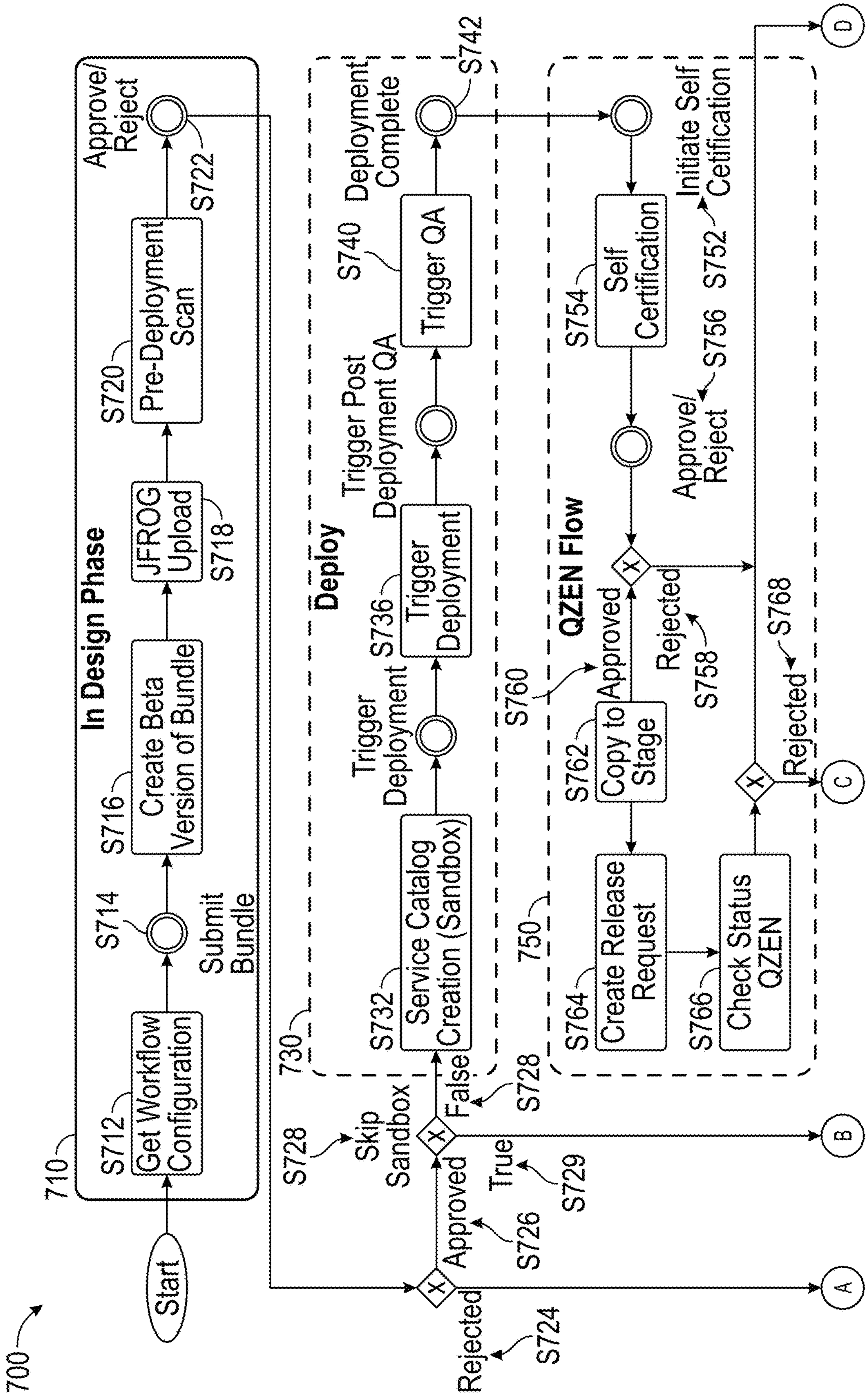
FIG. 7 is a flowchart of a method for providing end-to-end application onboarding according to at least one embodiment.
Figure 7:
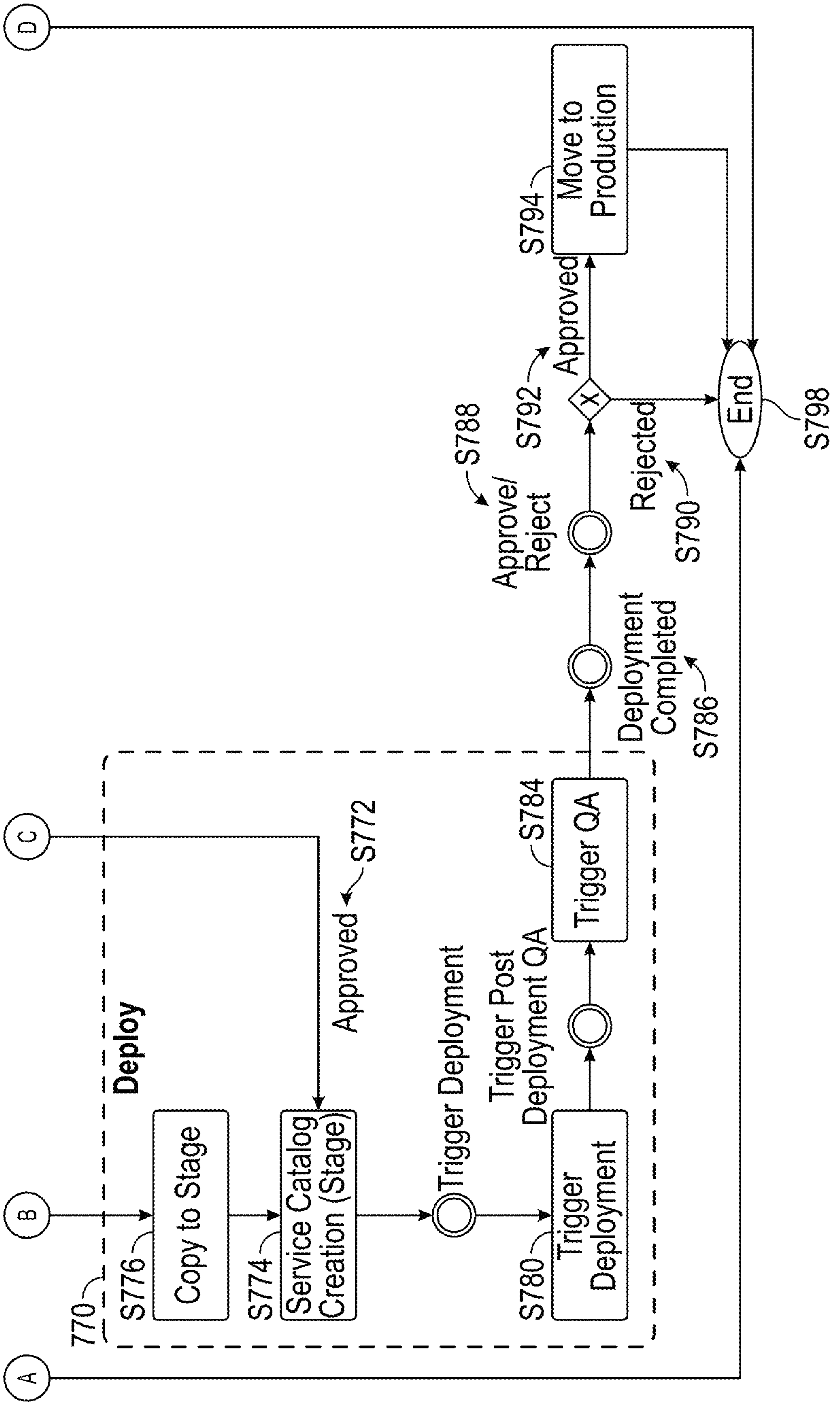

FIG. 7 is a flowchart 700 of a method for providing end-to-end application onboarding according to at least one embodiment.

In FIG. 7, in the In Design Phase 710, A workflow configuration is obtained S712. The application bundle is submitted S714. A beta version of the application bundle is then created S716. The application bundle is uploaded to non-productions artifactory S718, e.g., to JFrog. A pre-deployment scan is performed S720. A determination is made whether the application bundle is accepted or rejected S722. In response to being rejected S724, process ends S798. After being rejected the vendor edits the application bundle, creates a new application bundle, and begins again, or abandons the effort.

In response to being approved S726, a determination is made whether to perform sandbox testing S728. In response to determining not to skip sandbox testing S728, a Deploy phase 730 is entered and a service catalog entry is created for the sandbox S732. Deployment is triggered S736. QA testing is then triggered S740. Deployment is then completed S742.

After deployment is completed S742, the process enters the QZEN flow 750 where self-certification is initiated S752. After self-certification is received S754, a determination is made whether the application bundle is accepted or rejected S756. In response to being rejected S758, the process ends S798. In response to being approved S760, the application bundle is copied to staging S762. A release request is then created S764. QZEN status is checked S766. In response to QZEN being rejected S768, process ends S798.

In response to QZEN being approved S772, the process enters a Deploy phase 770 and a service catalog entry is created for the staging S774. In response to the sandbox testing being skipped S729, the application bundle is copied to staging S776 and a service catalog entry is created for the staging S774. Deployment is then triggered S780. Post-Deployment QA testing is triggered S784. The Deployment is completed S786. A determination is made whether the application bundle is accepted or rejected S788. In response to being rejected S790, the process ends S798. In response to being approved S792, the application bundle is moved to the Production Stage S794. The process then ends S798.

At least one embodiment of providing end-to-end application onboarding includes uploading an application bundle of a vendor to a pre-production system, requesting pre-production testing of the application bundle. in response to the application bundle passing the pre-production testing, receiving an indication of approval of the application bundle, in response to receiving the indication of approval of the application bundle, performing quality assurance testing of the application bundle in at least one pre-production test environment isolated from the production environment, in response to the application bundle passing the quality assurance testing in the at least one pre-production test environment isolated from the production environment, promoting the application bundle to the production environment, and in response to the application bundle not passing the quality assurance testing in the at least one pre-production test environment isolated from the production environment, passing the application bundle to the vendor for editing.

Figure 8:
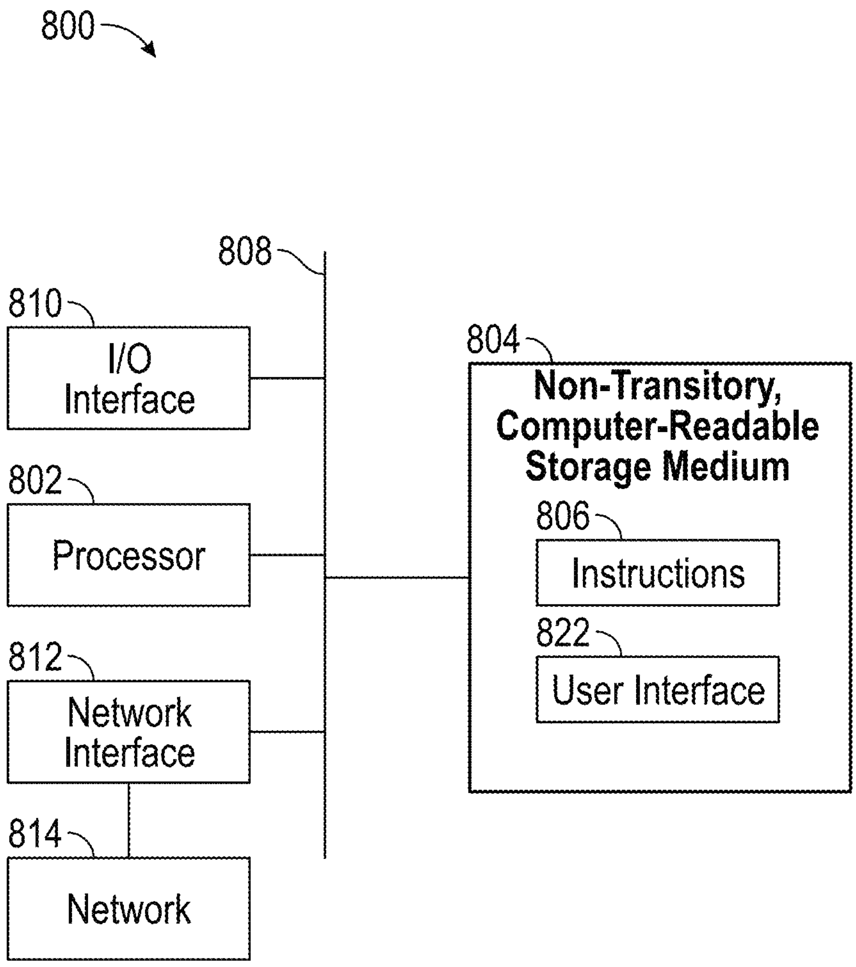
FIG. 8 is a high-level functional block diagram of a processor-based system 800 according to at least one embodiment.

FIG. 8 is a high-level functional block diagram of a processor-based system 800 according to at least one embodiment.

In at least one embodiment, processing circuitry 800 provides end-to-end application onboarding. Processing circuitry 800 implements the end-to-end application onboarding using processor 802. Processing circuitry 800 also includes a non-transitory, computer-readable storage medium 804 that is used to implement end-to-end application onboarding. Storage medium 804, amongst other things, is encoded with, i.e., stores, instructions 806, i.e., computer program code that are executed by processor 802 causes processor 802 to perform operations for end-to-end application onboarding. Execution of instructions 806 by processor 802 represents (at least in part) a network visualization application which implements at least a portion of the methods described herein in accordance with one or more embodiments (hereinafter, the noted processes and/or methods).

Processor 802 is electrically coupled to computer-readable storage medium 804 via a bus 808. Processor 802 is electrically coupled to an Input/output (I/O) interface 810 by bus 808. A network interface 812 is also electrically connected to processor 802 via bus 808. Network interface 812 is connected to a network 814, so that processor 802 and computer-readable storage medium 804 connect to external elements via network 814. Processor 802 is configured to execute instructions 806 encoded in computer-readable storage medium 804 to cause processing circuitry 800 to be usable for performing at least a portion of the processes and/or methods. In one or more embodiments, processor 802 is a Central Processing Unit (CPU), a multi-processor, a distributed processing system, an Application Specific Integrated Circuit (ASIC), and/or a suitable processing unit.

Processing circuitry 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

Processing circuitry 800 also includes network interface 812 coupled to processor 802. Network interface 812 allows processing circuitry 800 to communicate with network 814, to which one or more other computer systems are connected. Network interface 812 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 800 is configured to receive information through I/O interface 810. The information received through I/O interface 810 includes one or more of instructions, data, design rules, libraries of cells, and/or other parameters for processing by processor 802. The information is transferred to processor 802 via bus 808. Processing circuitry 800 is configured to receive information related to a User Interface (UI) 8221 through I/O interface 810. The information is stored in computer-readable medium 804 as UI 822.

In one or more embodiments, one or more non-transitory computer-readable storage media 804 having stored thereon instructions (in compressed or uncompressed form) that may be used to program a computer, processor, or other electronic device) to perform processes or methods described herein. The one or more non-transitory computer-readable storage media 804 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 804 includes a Compact Disk-Read Only Memory (CD-ROM), a Compact Disk-Read/Write (CD-R/W), and/or a Digital Video Disc (DVD).

In one or more embodiments, storage medium 804 stores computer program code 806 configured to cause processing circuitry 800 to perform at least a portion of the processes and/or methods for end-to-end application onboarding. In one or more embodiments, storage medium 804 also stores information, such as algorithm which facilitates performing at least a portion of the processes and/or methods for end-to-end application onboarding. Accordingly, in at least one embodiment, the processor circuitry 800 performs a method for end-to-end application onboarding. The process of uploading an application bundle of a vendor to a pre-production system, requesting pre-production testing of the application bundle, in response to the application bundle passing the pre-production testing, receiving an indication of approval of the application bundle, in response to receiving the indication of approval of the application bundle, performing quality assurance testing of the application bundle in at least one pre-production test environment isolated from the production environment, in response to the application bundle passing the quality assurance testing in the at least one pre-production test environment isolated from the production environment, promoting the application bundle to the production environment, and in response to the application bundle not passing the quality assurance testing in the at least one pre-production test environment isolated from the production environment, passing the application bundle to the vendor for editing provides at least the advantages of enabling an application vendor to create application bundles and onboard the applications using an end to end flow for the application bundle from application bundle creation to promotion of the application bundle to production through the approval cycles. The an integrated process integrated process for performing end-to-end application onboarding takes less time and reduces human errors because the process is automated. Vendors are also able to provide details to downstream systems automatically.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing end-to-end application onboarding, comprising:

configuring an end-to-end application onboarding system to provide a graphical notation for business procedures and to communicate procedures to one or more of a vendor, an application approver, and a release manager;

uploading an application bundle of the vendor to a database maintained by one or more storage devices;

in response to the application bundle being uploaded, automatically triggering a workflow configuration to be fetched from a workflow database and presented to the vendor, wherein the workflow configuration is configured by the vendor;

in response to the vendor obtaining the workflow configuration, automatically identifying artifacts of the application bundle to upload to a pre-production system;

receiving a request from the vendor to perform pre-production testing of the application bundle by the pre-production system based on one or more approval workflows involving the one or more of the vendor, the application approver, and the release manager;

in response to the application bundle passing the pre-production testing performed by the pre-production system, presenting an indication of approval of the application bundle by a Release Management/Ticketing System;

in response to the indication of approval of the application bundle being presented by the Release Management/Ticketing System, performing quality assurance testing of the application bundle by one or more systems in at least one pre-production test environment isolated from one or more systems of a production environment;

in response to the application bundle passing the quality assurance testing by the one or more systems in the at least one pre-production test environment isolated from the one or more systems of the production environment, promoting the application bundle to the one or more systems of the production environment, creating a service catalog entry for the application bundle at a production service catalog system, and providing production-related calls to other production systems by a service designer to promote the application bundle to an application marketplace, the application bundle being selected for use from the application marketplace; and in response to the application bundle not passing the quality assurance testing by the one or more systems in the at least one pre-production test environment isolated from the one or more systems of the production environment, sending, by the service designer to the vendor, a notification that the application bundle did not pass the quality assurance testing performed by the one or more systems in the at least one pre-production test environment, and passing the application bundle to the vendor for editing.

2. The method of claim 1, wherein the uploading the application bundle of the vendor to the pre-production system further includes submitting the application bundle to the service designer, wherein the service designer passes the application bundle to a pre-production artifactory.

3. The method of claim 1, wherein the performing quality assurance testing of the application bundle in the at least one pre-production test environment isolated from the one or more systems of the production environment further includes one of performing sandbox testing and staging testing, and skipping sandbox testing and performing the staging testing.

4. The method of claim 3, wherein the performing sandbox testing includes:

creating a pre-production service catalog entry;

deploying the application bundle to a sandbox environment;

triggering the sandbox testing for the application bundle;

setting up a deployment configuration for the application bundle;

requesting automated sandbox testing of the application bundle;

based on the application bundle passing the automated sandbox testing, initiating self-certification of the application bundle; and in response to the approval of the self-certification, promote the application bundle for performing the staging testing.

5. The method of claim 4, wherein the self-certification is rejected, the performing the sandbox testing further including updating a workflow to perform one of rejecting the application bundle and returning the application bundle to the vendor.

6. The method of claim 3, wherein the performing sandbox testing includes:

creating a pre-production service catalog entry;

deploying the application bundle to a sandbox environment;

triggering the sandbox testing for the application bundle;

setting up a deployment configuration for the application bundle;

performing manual sandbox testing on the application bundle;

based on the application bundle passing the manual sandbox testing, initiating self-certification of the application bundle; and in response to the approval of the self-certification, review and promote the application bundle for performing the staging testing.

7. The method of claim 3, wherein the performing the staging testing includes:

creating a release request for a pre-production release management system;

receiving approval of the application bundle from the pre-production release management system;

creating a pre-production service catalog entry and send to a staging testing environment;

deploying the application bundle to the staging testing environment;

triggering the staging testing for the application bundle;

setting up a deployment configuration for the application bundle;

requesting automated staging testing of the application bundle;

based on the application bundle passing the automated staging testing, receiving certification of the application bundle from the release management system; and in response to receiving the certification of the application bundle, promoting the application bundle to the one or more systems of the production environment.

8. The method of claim 1, wherein the promoting the application bundle to the one or more systems of the production environment includes:

promoting the application bundle to production artifactory.

9. A device for performing end-to-end application onboarding, configured to implement a pre-production system, a Release Management/Ticketing System, one or more systems of a production environment, one or more systems of a pre-production environment, and one or more systems of a pre-production test environment, the device further comprising storage associated with one or more storage devices, the device further being configured to:

configure an end-to-end application onboarding system to provide a graphical notation for business procedures and to communicate procedures to one or more of a vendor, an application approver, and a release manager;

upload an application bundle of the vendor to a database maintained by the one or more storage devices;

in response to the application bundle being uploaded, automatically trigger a workflow configuration to be fetched from a workflow database and presented to the vendor, wherein the workflow configuration is configured by the vendor;

in response to the vendor obtaining the workflow configuration, automatically identify artifacts of the application bundle to upload to a pre-production system;

receive a request from the vendor to perform pre-production testing of the application bundle by the pre-production system based on one or more approval workflows involving the one or more of the vendor, the application approver, and the release manager;

in response to the application bundle passing the pre-production testing performed by the pre-production system, present an indication of approval of the application bundle by the Release Management/Ticketing System;

in response to the indication of approval of the application bundle being presented by the Release Management/Ticketing System, perform quality assurance testing of the application bundle by the one or more systems in the pre-production test environment isolated from the one or more systems of the production environment;

in response to the application bundle passing the quality assurance testing by the one or more systems in the pre-production test environment isolated from the one or more systems of the production environment, promote the application bundle to the one or more systems of the production environment, create a service catalog entry for the application bundle at a production service catalog system; and provide production-related calls to other production systems by a service designer to promote the application bundle to an application marketplace, the application bundle being selected for use from the application marketplace; and in response to the application bundle not passing the quality assurance testing by the one or more systems in the pre-production test environment isolated from the one or more systems of the production environment, send, by the service designer to the vendor, a notification that the application bundle did not pass the quality assurance testing performed by the one or more systems in the at least one pre-production test environment, and pass the application bundle to the vendor for editing.

10. The device of claim 9, further configured to upload the application bundle of the vendor to the pre-production system by submitting the application bundle to the service designer, wherein the service designer passes the application bundle to a pre-production artifactory.

11. The device of claim 9, further configured to perform the quality assurance testing of the application bundle in the one or more systems in the pre-production test environment isolated from the one or more systems of the production environment by performing one of performing sandbox testing and staging testing, and skipping the sandbox testing and performing the staging testing.

12. The device of claim 11, further configured to perform the sandbox testing by creating a pre-production service catalog entry;

deploying the application bundle to a sandbox environment;

triggering the sandbox testing for the application bundle;

setting up a deployment configuration for the application bundle;

requesting one of automated sandbox testing and manual sandbox testing of the application bundle;

based on the application bundle passing one of the automated sandbox testing and the manual sandbox testing, initiating self-certification of the application bundle;

in response to approval of the self-certification, promote the application bundle for performing the staging testing; and in response to rejection of the self-certification, updating workflow to perform one of rejecting application and returning the application bundle to the vendor.

13. The device of claim 11, further configured to perform the staging testing by:

creating a release request for a pre-production release management system;

receiving approval of the application bundle from the pre-production release management system;

creating a pre-production service catalog entry and send to a staging testing environment;

deploying the application bundle to the staging testing environment;

triggering the staging testing for the application bundle;

setting up a deployment configuration for the application bundle;

requesting automated staging testing of the application bundle;

based on the application bundle passing the automated staging testing, receiving certification of the application bundle from the release management system; and in response to receiving the certification of the application bundle, promoting the application bundle to the one or more systems of the production environment.

14. The device of claim 9, further configured to promote the application bundle to the one or more systems of the production environment by:

promoting the application bundle to production artifactory.

15. A non-transitory computer-readable media having computer-readable instructions stored thereon, which when executed causes performance of operations comprising:

configuring an end-to-end application onboarding system to provide a graphical notation for business procedures and to communicate procedures to one or more of a vendor, an application approver, and a release manager;

uploading an application bundle of the vendor to a database maintained by one or more storage devices;

in response to the application bundle being uploaded, automatically triggering a workflow configuration to be fetched from a workflow database and presented to the vendor, wherein the workflow configuration is configured by the vendor;

in response to the vendor obtaining the workflow configuration, automatically identifying artifacts of the application bundle to upload to a pre-production system;

receiving a request from the vendor to perform pre-production testing of the application bundle by the pre-production system based on one or more approval workflows involving the one or more of the vendor, the application approver, and the release manager;

in response to the application bundle passing the pre-production testing performed by the pre-production system, presenting an indication of approval of the application bundle by a Release Management/Ticketing System;

in response to the indication of approval of the application bundle being presented by the Release Management/Ticketing System, performing quality assurance testing of the application bundle by one or more systems in at least one pre-production test environment isolated from one or more systems of a production environment;

in response to the application bundle passing the quality assurance testing by the one or more systems of the one pre-production test environment isolated from the one or more systems of the production environment, promoting the application bundle to the one or more systems of the production environment, creating a service catalog entry for the application bundle at a production service catalog system, and providing production-related calls to other production systems by a service designer to promote the application bundle to an application marketplace, the application bundle being selected for use from the application marketplace; and in response to the application bundle not passing the quality assurance testing by the one or more systems in the at least one pre-production test environment isolated from the one or more systems of the production environment, sending, by the service designer to the vendor, a notification that the application bundle did not pass the quality assurance testing performed by the one or more systems in the at least one pre-production test environment, and passing the application bundle to the vendor for editing.

16. The non-transitory computer-readable media of claim 15, wherein the uploading the application bundle of the vendor to the pre-production system further includes submitting the application bundle to the service designer, wherein the service designer passes the application bundle to a pre-production artifactory.

17. The non-transitory computer-readable media of claim 15, wherein the performing quality assurance testing of the application bundle in the at least one pre-production test environment isolated from the one or more systems of the production environment further includes one of performing sandbox testing and staging testing, and skipping the sandbox testing and performing the staging testing.

18. The non-transitory computer-readable media of claim 17, wherein the performing the sandbox testing includes:

creating a pre-production service catalog entry;

deploying the application bundle to a sandbox environment;

triggering the sandbox testing for the application bundle;

setting up a deployment configuration for the application bundle;

requesting one of automated sandbox testing and manual sandbox testing of the application bundle;

based on the application bundle passing the one of the automated sandbox testing and the manual sandbox testing, initiating self-certification of the application bundle;

in response to approval of the self-certification, promote the application bundle for performing the staging testing; and in response to rejection of the self-certification, updating workflow to perform one of rejecting application and returning the application bundle to the vendor.

19. The non-transitory computer-readable media of claim 17, wherein the performing the staging testing includes:

creating a release request for a pre-production release management system;

receiving approval of the application bundle from the pre-production release management system;

creating a pre-production service catalog entry and send to a staging testing environment;

deploying the application bundle to the staging testing environment;

triggering the staging testing for the application bundle;

setting up a deployment configuration for the application bundle;

requesting automated staging testing of the application bundle;

based on the application bundle passing the automated staging testing, receiving certification of the application bundle from the release management system; and in response to receiving the certification of the application bundle, promoting the application bundle to the one or more systems of the production environment.

20. The non-transitory computer-readable media of claim 15, wherein the promoting the application bundle to the one or more systems of the production environment includes:

promoting the application bundle to production artifactory.

* * * * *